United States Patent Office 3,787,517
Patented Jan. 22, 1974

3,787,517
OXIDATIVE DEHYDROGENATION
OF PARAFFINS
Werner O. Haag and Joseph N. Miale, Trenton, N.J.,
assignors to Mobil Oil Corporation
No Drawing. Filed Feb. 9, 1970, Ser. No. 10,023
Int. Cl. C07c 5/18
U.S. Cl. 260—683.3                                     3 Claims

ABSTRACT OF THE DISCLOSURE

Organic compounds containing at least one

grouping, e.g. ethylbenzene, are dehydrogenated by reacting with carbonyl sulfide in the vapor phase in the presence of a heavy metal catalyst on a carrier, for example, iron on silica or silica alone.

BACKGROUND OF THE INVENTION

This invention relates to a process for the dehydrogenation of organic compounds. More specifically, this invention is directed to the catalytic vapor phase oxidative dehydrogenation of organic compounds by reaction with carbonyl sulfide in the presence of a heavy metal catalyst on a carrier.

The dehydrogenation of organic compounds for the production of compounds having a higher degree of unsaturation by oxidative dehydrogenation is generally well known. The process may be described as the stoichiometric reaction of a compound containing a paraffinic group with a hydrogen acceptor or oxidant in accordance with the general equation:

wherein $x$ is the hydrogen acceptor or oxidant, to produce an olefinic group and a compound $H_2X$.

As the oxidant X oxygen has been commonly employed, but in general, with resulting low selectivity. This also applies to the halogens, with the exception of iodine, which produces olefins in high yields. However, the corrosion problems and high cost of iodine have prevented commercialization so far.

The use of sulfur as a relatively available and cheap oxidant is well known, reacting at moderate temperatures of 400–470° F. with paraffins to yield mostly sulfides and disulfides. At high temperatures paraffins with four or more carbon atoms yield thiophenes and the conversion of cyclohexane to aromatics with sulfur is an old, well-established laboratory procedure. The use of sulfur in the formation of styrene from ethyl benzene has been claimed in the recent patent to Schuman, U.S. Pat. No. 3,3,44,201, Sept. 26, 1967.

The use of sulfur dioxide as the oxidant in the conversion of paraffins ($C_6$–$C_{10}$) to aromatics has been reported by V. J. Frilette in Chemie et Industrie, 88, 487 (1962), with good yields over CaO and MgO as catalysts, but involving some problems due to high exothermicity and the formation of benzothiophenes. The use of sulfur dioxide as the oxidant in the conversion of paraffins ($C_6$–$C_{10}$) to olefins and aromatics has also been reported by C. R. Adams, I & E C 61 30 (1969), with good yields over bismuth phosphotungstate, bismuth molybdate and calcium nickel phosphate as catalysts wth selectivities for unsaturated hydrocarbons of 0–75%, thiophenes being a major product for paraffins having carbon chain-lengths greater than three. He obtained high selectivity with ethylbenzene but not with other alkyl aromatics.

In a recently issued patent to Boswell, U.S. Pat. No. 3,399,243 Aug. 27, 1968, carbonyl sulfide, COS, is disclosed as an excellent oxidant for the conversion of ethylbenzene to styrene. The reaction proceeds at relatively high rates of conversion per pass and in high yields over magnesia as a catalyst.

The U.S. Pat. No. 3,429,943 issued to Trevillyan et al. discloses conversion of paraffins to olefins by reacting them with carbonyl sulfide in the absence of catalyst. They used excess hydrocarbon and very long contact times. Conversion drops rapidly with contact time while adverse selectivity effects are incurred by increasing temperature to achieve higher conversion.

SUMMARY OF THE INVENTION

In accordance with the present invention, organic compounds are dehydrogenated by reaction with carbonyl sulfide, COS, in the presence of a supported heavy metal catalyst, to produce compounds having a higher degree of unsaturation than the starting material.

The process is applicable to a wide variety of organic compounds which may be either hydrocarbon or substituted hydrocarbons containing at least one

group. The hydrocarbons may, be saturated or unsaturated and include alkanes, cycloalkanes, and alkylaryl compounds. The substituted hydrocarbon compounds may contain halogen, oxygen, nitrogen or sulfur as the substituent. Various classes of organic compounds are thus amenable to the process, including alcohols, acids, esters, ethers, ketones, aldehydes, nitriles and halides. Among the preferred compounds are the lower alkanes such as propane, isobutane, ethyl benzene, ethyl acetate, methyl isobutyrate, isobutyl alcohol, methyl ethyl ketone, propionitrile, cyclohexanol, cyclopentanol, cyclohexanone, p-chlor and p-brom-ethyl benzene and p-methoxy-ethyl benzene.

The carbonyl sulfide employed in the present process as the oxidant may be charged as such with the feed, or may be formed in situ, as by the addition of a mixture of carbon monoxide and sulfur, hydrogen sulfide and carbon monoxide, or of carbon dioxide and carbon disulfide. Throughout the present specification and claims, the term "carbonyl sulfide" is accordingly intended to be inclusive of carbonyl sulfide whether formed in situ in the reactor or formed as such prior to introduction into the reaction.

The catalysts employed in the present invention are of special importance and constitute a point of particular novelty. These catalysts are, in general, either the (heavy) metals, Groups I–B, II–B and Groups III to Group VIII, e.g., the elements scandium, titanium, vanadium, chromium, molybdenum, manganese, iron, cobalt, nickel, cadmium, tin, antimony, and bismuth (including compounds thereof) or silica alone. Especially preferred catalysts are iron, cobalt, nickel and vanadium.

The catalysts are deposited on support or carrier material which is selected from a large class of known catalyst supports which are generally difficultly reducible oxides such as alumina, silica, boria, magnesia and silica-alumina. The metal catalyst may be deposited on the catalyst support material by any of the well known methods employed in this art, e.g. by impregnation, evaporation from a solution, etc.

The catalysts are most commonly prepared from compounds of heavy metals, including their oxides, sulfides, hydroxides, silicates, citrates, sulfates, as well as mixtures thereof.

An especially preferred catalyst system has been found to be iron, prepared from ferric ammonium citrate deposited on a pure form of silica, such as silica gel pre pared from ethylorthosilicate, which has been activated by treatment with hydrogen sulfide before use.

While as pointed out above, the oxidative dehydrogenation reaction using carbonyl sulfide as oxidant is in stoichiometric proportions, the molar ratios of organic feed material to the oxidant may vary from 0.2 to 10. However, the preferred range of ratios has been found to be from 1 to 4. The reaction may be carried out under pressures of 1 to 5 atmospheres although one atmosphere is usually preferred.

The liquid hourly space velocity (LHSV-liquid volume compound charged per volume of catalyst per hour) may be between 0.05 to 40, preferably 2 to 20 and is correlative with the temperature. The temperature employed can be between 300° C. and about 700° C., although a preferred range is between about 500° C. and 600° C.

The invention will be further understood by reference to the following examples.

Example 1

An isobutane and carbonyl sulfide feed mixture in molar ratio of 1 to 3 was passed over a silica supported iron catalyst which had been previously prepared from ferric ammonium citrate deposited on pure silica gel and activated by treatment with hydrogen sulfide. The high degree of activity is shown in the following tabulated results:

TABLE I.—ISOBUTANE AND CARBONYL SULFIDE
(1:3 mole ratio) over iron silica

| | Contact time, seconds | Percent | |
|---|---|---|---|
| | | Conversion | Selectivity |
| Temp., ° C.: | | | |
| 538 | 2.1 | 67 | 92 |
| 538 | 4.3 | 74 | 91 |
| 538 | 17.0 | 86 | 59 |

Example 2

In a run carried out as in Example 1, but for a production of propene using propane as the organic feed material and at a temperature of 593° C., all other conditions with respect to molar proportions and catalyst being the same, it was found that with a contact time of 17 seconds, the conversion was 66% and selectivity 95%.

Example 3

The conversion of ethylbenzene to styrene was carried out using carbonyl sulfide as oxidant over a catalyst system as employed in Example 1. At atmospheric pressure and with a feed stock molar ratio of COS to ethylbenzene of 4.45, the results obtained at temperatures of 538° C. and 593° C. and at varying space velocities are tabulated below:

TABLE II

| Catalyst | Temperature, ° C. | LHSV | Percent | |
|---|---|---|---|---|
| | | | Conversion | Selectivity |
| Fe/SiO₂ | 538 | 0.5 | 92 | 97 |
| | 538 | 1.0 | 92 | 98 |
| | 538 | 2.0 | 74 | 99 |
| | 593 | 8.0 | 68 | 98 |

Example 4

The conversion of ethylbenzene to styrene was carried out as in Example 3, but substituting for the catalyst system cobalt as the catalyst deposited on silica. At a temperature of 538° C .and molar proportions of COS:ethylbenzene of 4.5, the following results were obtained:

TABLE III

| | Percent | |
|---|---|---|
| | Conversion | Selectivity |
| LHSV: | | |
| 3.0 | 53 | 99 |
| 6.0 | 55 | 99 |

Example 5

The conversion of ethylbenzene to styrene was carried out as in Example 3, but substituting nickel as the catalyst deposited on silica. At a temperature of 538° C. and LHSV of 3.0, the percent conversion was 73% and selectively of 98%.

Example 6

The reaction as carried out in Example 5 was repeated but with vanadium as the catalyst supported on silica. This resulted in conversion of 84% and percent selectivity of 99%.

Examples 7-13

Conversion of ethylbenzene was carried out as in Example 3, but substituting the following catalysts: copper on silica, cadmium on silica, molybdenum on silica, iron on magnesia, cerium on silica, bismuth on silica, all prepared from deposition of concentrated salt solutions by the basic method used in Example 1 and antimony on magnesia prepared by ballmilling equal amounts of antimony sulfide (Sb₂S₃) and magnesia followed by calcination and hydrogen uslfide treatment prior to use.

| Ex. | Catalyst | ° C. | LHSV | Percent | |
|---|---|---|---|---|---|
| | | | | Conversion | Selectivity |
| 7 | Copper/silica | 538 | 1.5 | 40 | 98 |
| 8 | Cadmium/silica | 538 | 3.0 | 51 | 99+ |
| 9 | Molybdenum/silica | 538 | 3.0 | 91 | 99+ |
| | | | 6.0 | 60 | 99+ |
| 10 | Iron/magnesia | 538 | 3.0 | 54 | 98 |
| 11 | Cerium/silica | 538 | 3.0 | 69 | 99+ |
| | | | 5.0 | 54 | 99+ |
| 12 | Bismuth/silica | 538 | 3.0 | 60 | 98 |
| | | | 0.75 | 75 | 98 |
| 13 | Antimony/magnesia | 538 | 3.0 | 45 | |
| | | | 0.75 | 79 | 99+ |
| | | 593 | 3.0 | 82 | |
| | | | 12.0 | 36 | 99+ |

Example 14

A cyclohexanone and carbonyl sulfide feed mixture in molar ratio of 1 to 3 was passed over a silica supported iron catalyst prepared as in Example 1.

At 482° C. and 15 LHSV, conversion was 6% with a selectivity of 87% to cyclohexene-1-one. When no catalyst was present, the same cyclohexanone/carbonyl sulfide mixture did not react at 2–4 LHSV and 426–538° C.

Example 15

A feed mixture of cyclohexanol and carbonyl sulfide in molar ratio of 1 to 3 was passed over a conventional chromia alumina reforming catalyst at 426° C. and 0.5 LHSV. The following product distribution was obtained at 91% conversion:

| | Percent |
|---|---|
| Cracked products | 13 |
| Cycloolefins | 29 |
| Benzene | 20 |
| Cyclic ketones | 2.5 |
| Phenol | 7 |
| Thiophenol | 13 |
| Unidentified intermediates | 5.5 |

Example 16

A feed mixture of ethylacetate and carbonyl sulfide in molar ratio of 1:3 was passed over a silica supported iron catalyst prepared as in Example 1, producing vinyl acetate. At 538° C. and 1.7 LHSV, conversion was 8.8% with 95% selectivity for vinyl acetate.

Example 17

A feed mixture of methyl isobutyrate and carbonyl sulfide in molar ratio of 1:3 was passed over a silica supported iron catalyst, producing methyl methacrylate. At 538° C. and 1.1 LHSV conversion was 11% and selectivity 83%.

Example 18

A mixture of methyl ethyl ketone and carbonyl sulfide in molar ratio of 1:2 was passed over a silica supported iron catalyst prepared as in Example 1. The conversion products consisted of a mixture of butanol-2 and methyl vinyl ketone. At 2 LHSV and 538° C., conversion was 11% with 95% selectivity for methyl vinyl ketone and 98% for the mixture.

Under the same conditions with the pure silica base alone, conversion was 19% with 28% selectivity for the methyl vinyl ketone and 88% selectivity for the mixture.

Example 19

A feed mixture of propionitrile and carbonyl sulfide in molar ratio of 1:2 was passed over a silica-supported iron catalyst prepared as in Example 1, producing acrylonitrile. At 538° C. and 0.26 LHSV, conversion was 19% and selectivity was 89%.

EXAMPLES ON THE USE OF SILICA ALONE

Example 20

An isobutane and carbonyl sulfide feed mixture in molar ratio of 1 to 3 was passed over pure silica gel that had been previously prepared from ethyl orthosilicate and that had a surface area of 436 m.²/g. (B.E.T.). The catalyst was calcined at 538° C. prior to use. Activity and selectivity for formation of isobutene are shown in the following table.

| | | Percent | |
|---|---|---|---|
| | Contact time, sec. | Conversion | Selectivity |
| Temp., ° C.: 538 | 12.8 | 36 | 96 |
| | 17.1 | 56 | 97 |

Example 21

An isobutane and carbonyl sulfide feed mixture in varying molar ratios was passed over an aliquot of the silica gel described in Example 20 at 538° C. A similar series was carried out at the same contact time, using sulfur as a reactant, said sulfur being fed by vaporizing into a helium carrier stream. Results are shown in the following table:

| | | | Percent | |
|---|---|---|---|---|
| iC₄/S* | Sulfur reagent | Minutes on stream | Conversion | Selectivity |
| 1:3 | COS | 150 | 41 | 94 |
| 1:3 | S | 113 | 71 | 41 |
| 1:1 | COS | 242 | 20.3 | 93 |
| 1:1 | S | 320 | 60 | 46 |
| 2:1 | COS | 287 | 6 | 84 |
| 2:1 | S | 147 | 50 | 60 |

*Moles of isobutane per atom of sulfur.

This example shows that under comparable conditions sulfur is more active for isobutane conversion than carbonyl sulfide. However, the selectivity is much lower.

Example 22

Conversion of ethylbenzene to styrene was carried out using carbonyl sulfide as the oxidant on an aliquot of silica gel described in Example 20. At atmospheric pressure, 0.5 LHSV, and with a feedstock molar ratio of COS to ethylbenzene of 4.45, the following results were obtained:

| | Percent | |
|---|---|---|
| | Conversion | Selectivity |
| Temperature, degrees: | | |
| 538 | 50 | 99 |
| 593 | 82 | 96 |

Example 23

A mixture of methyl ethyl ketone and carbonyl sulfide in molar ratio of 1:2 was passed over silica producing methyl vinyl ketone and butanol-2. Results follow at 538° F.

| | Percent | |
|---|---|---|
| | Conversion | Selectivity to MVK (to MVK + BuOH) |
| LHSV: | | |
| 2 | 19 | 28 (88) |
| 1 | 29 | 27 (74) |

What is claimed is:
1. A process for the catalytic vapor phase oxidative dehydrogenation of a paraffinic hydrocarbon containing at least one grouping

which comprises contacting said compound and carbonyl sulfide with a catalyst consisting of a heavy metal deposited on an oxide carrier or silica.

2. The process as defined in claim 1 wherein the paraffinic hydrocarbon is isobutane and the catalyst employed is iron deposited on silica.

3. The process as defined in claim 1 wherein the paraffinic hydrocarbon is propane and the catalyst employed is iron deposited on silica.

References Cited
UNITED STATES PATENTS 3,399,243 8/1968 Boswell _____ 260—669 R
3,429,943 2/1969 Trevillyan et al. ____ 260—683.3

DELBERT E. GANTZ, Primary Examiner

V. O'KEEFE, Assistant Examiner

U.S. Cl. X.R.

260—466, 491, 586, 669